(12) United States Patent
Grieve et al.

(10) Patent No.: US 7,674,538 B2
(45) Date of Patent: *Mar. 9, 2010

(54) APPARATUS AND METHOD FOR HIGH EFFICIENCY OPERATION OF A HIGH TEMPERATURE FUEL CELL SYSTEM

(75) Inventors: Malcolm J. Grieve, Fairport, NY (US); John A. MacBain, Carmel, IN (US); Kaushik Rajashekara, Carmel, IN (US); Gregory W. Alexander, Pittsford, NY (US)

(73) Assignee: Delphi Technologies, Inc., Troy, MI (US)

( * ) Notice: Subject to any disclaimer, the term of this patent is extended or adjusted under 35 U.S.C. 154(b) by 1540 days.

This patent is subject to a terminal disclaimer.

(21) Appl. No.: 10/793,354

(22) Filed: Mar. 4, 2004

(65) Prior Publication Data
US 2005/0196652 A1 Sep. 8, 2005

(51) Int. Cl.
H01M 8/06 (2006.01)
(52) U.S. Cl. .............................. 429/17; 429/13; 429/19
(58) Field of Classification Search .................... 429/30, 429/34, 38, 12, 13, 22, 24, 17, 23, 19, 20
See application file for complete search history.

(56) References Cited

U.S. PATENT DOCUMENTS 4,522,894 A 6/1985 Hwang et al.
5,308,456 A * 5/1994 Kunz et al. ................... 429/16
5,932,366 A 8/1999 Ringel et al.
2003/0113596 A1 6/2003 Huang et al.
2004/0131912 A1 * 7/2004 Keefer et al. .................. 429/34

FOREIGN PATENT DOCUMENTS

| EP | 0 269 877 | 6/1988 |
|---|---|---|
| EP | 0 948 070 | 10/1999 |
| JP | 07 320765 | 12/1995 |
| JP | 09 180748 | 7/1997 |
| WO | 2004/064220 | 7/2004 |

OTHER PUBLICATIONS

European Search Report dated Jun. 24, 2005.

* cited by examiner

*Primary Examiner*—Patrick Ryan
*Assistant Examiner*—Monique Wills
(74) *Attorney, Agent, or Firm*—Thomas N. Twomey

(57) ABSTRACT

Apparatus and method for operating a fuel cell system including a hydrocarbon catalytic reformer and close-coupled fuel cell stack by recycling anode syngas into the reformer in a range between 60% and 95% of the total syngas. At equilibrium conditions, oxygen required for reforming of hydrocarbon fuel is derived from endothermically reformed water and carbon dioxide in the syngas. Reforming temperature is between about 650° C. to 750° C. The stack exit temperature is about 800° C. to 880° C. such that the required endotherm can be provided by the sensible heat of the recycled syngas. The stack has approximately equal anode and cathode gas flows in opposite directions, resulting in cooling from both the anodes and cathodes.

11 Claims, 1 Drawing Sheet

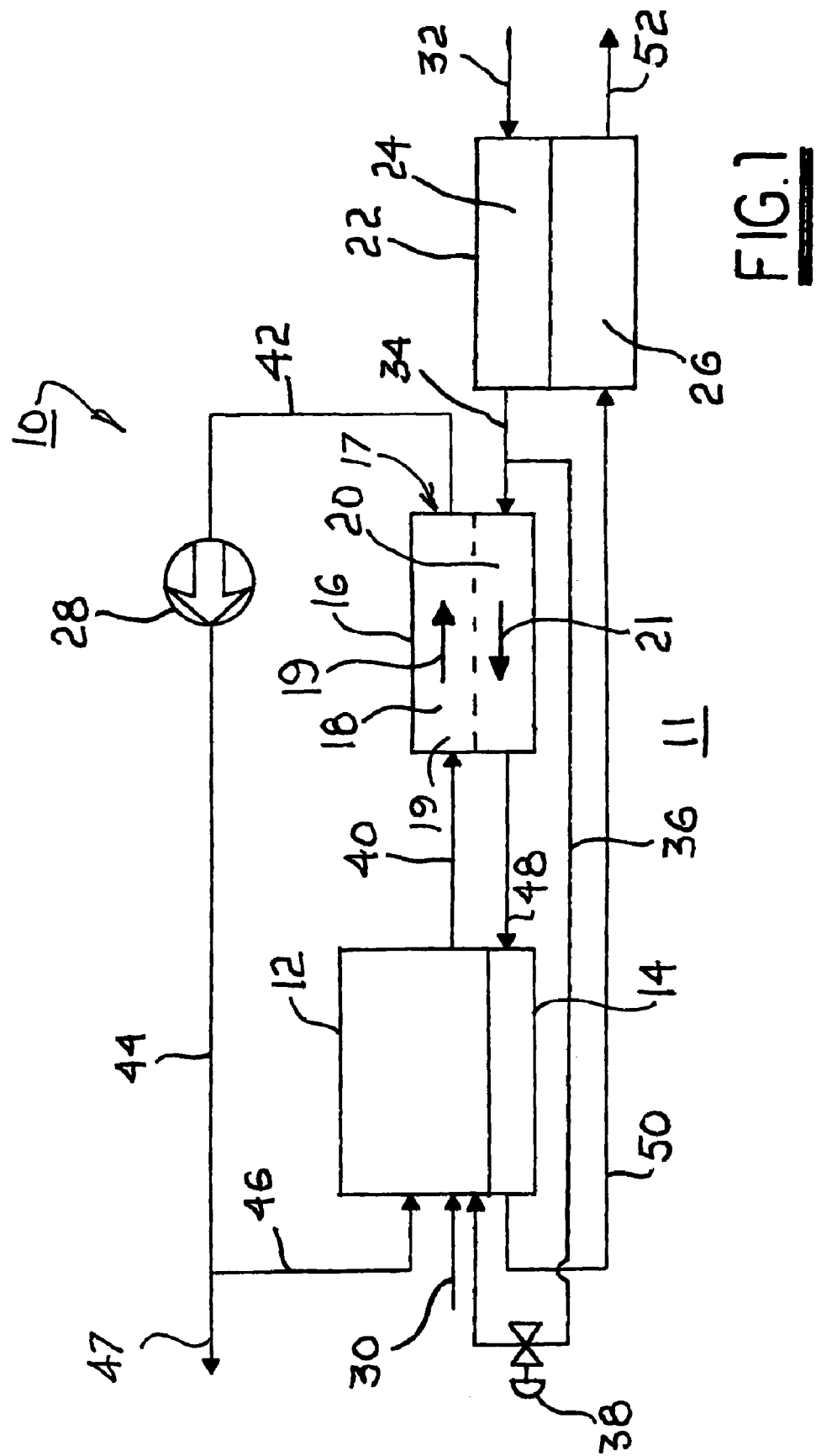

APPARATUS AND METHOD FOR HIGH EFFICIENCY OPERATION OF A HIGH TEMPERATURE FUEL CELL SYSTEM

TECHNICAL FIELD

The present invention relates to high temperature fuel cells having a solid-oxide electrolytic layer separating an anode layer from a cathode layer; more particularly, to high temperature fuel cell systems comprising a plurality of individual fuel cells in a stack wherein fuel is provided by an associated catalytic hydrocarbon reformer; and most particularly, to such a fuel cell system wherein steady-state reforming is substantially endothermic and wherein a high percentage of the anode tail gas is recycled through the reformer to improve system efficiency.

BACKGROUND OF THE INVENTION

Fuel cells which generate electric current by controllably combining elemental hydrogen and oxygen are well known. In one form of such a fuel cell, an anodic layer and a cathodic layer are separated by a non-permeable electrolyte formed of a ceramic solid oxide. Such a fuel cell is known in the art as a "solid-oxide fuel cell" (SOFC). It is further known to combine a plurality of such fuel cells into a manifolded structure referred to in the art as a "fuel cell stack" and to provide a partially-oxidized "reformate" fuel ("syngas") to the stack from a hydrocarbon catalytic reformer.

Prior art catalytic partial-oxidizing (POX) reformers typically are operated exothermically by using intake air to partially oxidize hydrocarbon fuel as may be represented by the following equation for a hydrocarbon and air,

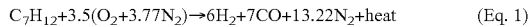
$$C_7H_{12}+3.5(O_2+3.77N_2) \rightarrow 6H_2+7CO+13.22N_2+\text{heat} \quad \text{(Eq. 1)}$$

wherein the oxygen/carbon atomic ratio is 1.0, and the resulting reformate temperature is in the range of about 1000° C. Prior art reformers typically are operated slightly fuel-lean of stoichiometric to prevent coking of the anodes from non-reformed hydrocarbon decomposition within the fuel cell stack. Thus some full combustion of hydrocarbon and reformate occurs within the reformer in addition to, and in competition with, the electrochemical combustion of the fuel cell process. Such full combustion is wasteful of fuel and creates additional heat which must be removed from the reformate and/or stack, typically by passing a superabundance of cooling air through the cathode side of the stack.

It is known to produce a reformate containing hydrogen and carbon monoxide by endothermic steam reforming (SR) of hydrocarbon in the presence of water which may be represented by the following equation,

$$C_7H_{12}+7H_2O+\text{heat} \rightarrow 13H_2+7CO \quad \text{(Eq. 2)}$$

wherein the oxygen/carbon atomic ratio is still 1.0 and the reformate temperature is still about 1000° C. The disadvantages of this process for providing reformate for operating a fuel cell are 1) a continuous water supply must be provided; 2) heat must be provided, typically in the form of burned fuel, thus reducing the efficiency of the system; and 3) the reforming temperature is hard on the reformer materials and catalyst.

High temperature fuel cells inherently produce a combination of direct current electricity, waste heat, and syngas. The syngas, as used herein, is a mixture of unburned reformate, including hydrogen, carbon monoxide, and nitrogen, as well as combustion products such as carbon dioxide and water. In some prior art fuel cell systems, the syngas is burned in an afterburner, and the heat of combustion is partially recovered by heat exchange to the reformer, to the cathode inlet air, or both.

In accordance with the invention disclosed in the co-pending and commonly owned patent application Ser. No. 10/793,302 filed on Mar. 4, 2004, entitled "Apparatus and Method for Operation of a High Temperature Fuel Cell System Using Recycled Anode Exhaust", a relatively small percentage, typically between 5% and 30%, of the anode syngas may be recycled into the reformer a) to increase fuel efficiency by endothermic reforming of water and carbon dioxide in the syngas in accordance with Equation 2 above (thus combining POX and SR reforming); b) to add excess water to the reformate to increase protection against anode coking; and c) to provide another opportunity for anode consumption of residual hydrogen. In such systems, and especially when using heavy fuels such as gasoline and diesel, the reformer typically is operated at a high temperature (which may even exceed the stack temperature) to provide the energy necessary for endothermic reforming. However, such high temperatures may be deleterious to the reformer over a period of time, and tend to lower system efficiency. From a durability point of view, it is desirable to be able to operate a reformer at the lowest temperature possible (without being in an operating region of carbon formation).

In a fuel cell stack, the reformate consumed is converted into approximately equal amounts of heat and electricity. The stack is cooled primarily by the flow of gases through it. Even with a modest amount of recycle flow added to the reformate, the total reformate massflow is relatively small, on the order of one-tenth the massflow of the cathode air, so the majority of cooling is done by cathode air. As previously noted, in endothermic reforming of recycled syngas with modest recycle rates, the reformate produced cannot be cooled much below stack temperature without risk of carbon nucleation. Therefore, in order to keep a reasonable temperature gradient in the stack between the inlet and outlet of the cathode, a very high cathode air massflow is required, being many times the amount required for the electrochemistry of the stack. This creates an added energy parasitic to the stack in the form of a very large air blower, and also tends to make the size of the cathode heat exchanger much larger than would otherwise be necessary.

What is needed in the art is a means for reducing the superabundance of air required in operation of a high temperature fuel cell system.

What is further needed is a means for improving the efficiency of reformer and stack processes while operating the reformer at a temperature below the stack temperature; for minimizing the size and weight of the heat exchangers; and for retaining most or all of the latent heat value of the anode tail gas for downstream processes.

It is a principal object of the present invention to provide high efficiency operation of a high temperature fuel cell system with reduced total air flow and endothermic reforming.

BRIEF DESCRIPTION OF THE INVENTION

Briefly described, a method for operating a hydrocarbon catalytic reformer and close-coupled fuel cell system in accordance with the invention comprises recycling a high percentage of anode syngas into the reformer, preferably in excess of 60%, and as high as 95%. Although air must be supplied to the reformer at start-up, after the system reaches equilibrium operating conditions some or all of the oxygen required for reforming of hydrocarbon fuel is derived from endothermically reformed water and carbon dioxide in the syngas. The recycle rate is considerably higher than the minimum required to supply these oxidants to the fuel. However, the high atomic oxygen/carbon ratio allows lower reforming temperature, in the range of about 650° C. to 750° C., without carbon formation, even with heavy fuels such as gasoline, diesel, or jet fuel. This temperature is sufficiently lower than the stack exit temperature of about 800° C. to 880° C. or higher that most or all of the required endotherm can be provided by the sensible heat of the recycled syngas.

The high stack exit temperature is achieved by having approximately equal cooling from the anode and cathode sides of the stack. The cathode air flow is significantly reduced over that of the prior art. Overheating of elements within the stack is prevented by configuring the approximately equal anode and cathode gas flows in opposite directions through their respective gas spaces ("counterflow"), such that entering reformate cools the exiting region of the cathode and exiting cathode air, and entering cathode air cools the exiting region of the anode and the exiting syngas. This is a significant improvement over the prior art cross-flow or co-flow arrangements which inherently have an area of the stack and gas seals running undesirably close to, or even above, the syngas exit temperature.

Using a 90% syngas recycle in accordance with the invention, system fuel efficiencies greater than 50% may be achieved, as well as increased power density in the fuel cell stack, improved stack cooling, lower parasitic losses in air supply, more efficient reforming, and reduced cathode air and reformer heat exchanger sizes.

BRIEF DESCRIPTION OF THE DRAWINGS

The present invention will now be described, by way of example, with reference to the accompanying drawing, in which FIG. 1 is a schematic drawing of a high temperature fuel cell system in accordance with the invention.

DESCRIPTION OF THE PREFERRED EMBODIMENTS

Referring to FIG. 1, a high temperature fuel cell system 10 as may be suited to use as an auxiliary power unit (APU) in a vehicle 11 includes components known in the art of solid-oxide or molten carbonate fuel cell systems. FIG. 1 is not a comprehensive diagram of all components required for operation but includes only those components novelly formed and/or arranged in accordance with the apparatus and method of the invention. Missing components will be readily inferred by those of ordinary skill in the art.

A hydrocarbon catalytic reformer 12 includes a heat exchanger 14, preferably formed integrally therewith. A fuel cell stack 16 comprises preferably a plurality of individual fuel cell elements 17 connected electrically in series as is known in the art. Stack 16 includes passageways for passage of reformate across the anode surfaces of stack anodes 19, the passageways being shown collectively and schematically as passageway 18. Stack 16 also includes passageways for passage of air across the cathode surfaces of the stack cathodes 21, the passageways being shown collectively and schematically as passageway 20. Preferably, passageways 18 and 20 are arranged within stack 16 such that reformate flows across the anode surfaces in a direction different from the direction of air flow across the cathode surfaces. Preferably, the reformate flow and air flow directions 19, 21 are directly opposed (counterflow) instead of crossing (crossflow), as is well known in the prior art, or flowing in the same direction (coflow). A cathode air heat exchanger 22 includes an intake air side 24 and an exhaust air side 26. A high temperature recycle pump 28 is provided for recycling a portion of the anode tail gas into an inlet of the reformer, and for exporting syngas to an external process 47. Syngas may also be used as a fuel to trim temperatures in the reformer and cathode air heating function inside the system (not shown).

Endothermic reforming with high percentage syngas recycle may be represented by the following equation,

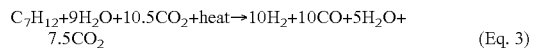

$$C_7H_{12}+9H_2O+10.5CO_2+\text{heat}\rightarrow 10H_2+10CO+5H_2O+7.5CO_2 \qquad (\text{Eq. 3})$$

wherein the oxygen/carbon ratio is 1.715, and the reformate temperature is about 750° C. Thus 4/9 of the hydrogen consumed to produce water in the electrochemical process of the fuel cell stack is recovered by endothermic reforming and is used over again, thus greatly increasing the hydrocarbon fuel efficiency of the system. Further, the energy required for the water reforming is derived from the "waste" energy in the anode syngas which in prior art high temperature fuel cells is discarded in the superabundance of cathode cooling air.

In operation, fuel is controllably supplied from a source (not shown) via line 30 to an inlet of reformer 12, as is known in the art. Fuel may comprise any conventional or alternative fuel as is known in the art, for example, gasoline, diesel, jet fuel, kerosene, propane, natural gas, carbon, biodiesel, ethanol, and methanol. Air is supplied from a source (not shown), such as a blower or other air pump, via line 32 to intake air side 24 of heat exchanger 22 and thence via line 34 to cathode passageway 20. At start-up, heated air is also supplied from heat exchanger 22 via line 36 to an inlet on reformer 12 to provide oxygen for reformer start-up in known fashion. At a time after start-up when such air is no longer needed, or may be reduced in volume in accordance with the invention, the air flow to the reformer may be controllably modulated by an air valve 38.

Reformate is supplied via line 40 from reformer 12 to anode passageway 18. Anode tail gas is exhausted from stack 16 via line 42 and is preferably assisted by inline pump 28. Syngas is exhausted from pump 28 via line 44, and a portion of the exhausted syngas may be recycled to an inlet of reformer 12 via line 46. Preferably, the recycled portion in line 46 is between about 50% and about 95% of the total syngas flow in line 44.

Heated cathode air is exhausted from cathode passageway 20 via line 48 and is provided to reformer heat exchanger 14 wherein heat is abstracted to assist in reforming processes within reformer 12. Spent air is exhausted from heat exchanger 14 via line 50 and is passed through exhaust side 26 of heat exchanger 22 wherein heat is abstracted by intake air in inlet side 24. Cooled air is discharged to atmosphere via line 52.

In an exemplary method of operation of 5 kW SOFC APU based on system 10 in accordance with the invention, syngas flow being recycled to reformer 12 via line 46 is at least about 75%, and preferably between about 90% and 95%, of the total syngas amount flowing through line 44. This is in contrast with prior art recycle flows of about 25% or less. Fuel, recycle syngas, and oxidant flows to reformer 12 are adjusted in known fashion such that reformate flow in line 40 to stack 16 is about 6.4 grams/second at a temperature of about 650° C. Air flow through line 34 to stack 16 is about 8.0 grams/second at a temperature of about 680° C. Stack 16 is sized such that the anode tailgas is exhausted from passageway 18 at a temperature of about 840° C. and air is exhausted from passageway 20 at a temperature of about 840° C.

Under these or similar steady-state operating conditions, little or no air must be provided to reformer 12 via line 36 and valve 38. Sufficient heat is provided to the reformer from the sensible heat of the recycled tail gas to permit endothermic reforming of the input fuel and the water and carbon dioxide in the syngas. This requires that the in-line pump 28 is capable of pumping high temperature gas and that line 44 is designed to avoid heat losses to lower temperature zones of the system.

Note that the reformer is thus permitted to operate at a significantly lower temperature (reformate temperature approximately 100 to 200° C. less than stack temperature) than in the prior art exothermic reforming (reformate temperature >800° C. to 1000° C.), which is highly beneficial to longevity of the reformer catalyst.

Note also that most, if not all, of the oxygen required for endothermic reforming is obtained from the water and carbon dioxide in the recycled anode tailgas. The oxygen contained in the water and carbon dioxide has come from cathode oxygen that has migrated through the electrolyte for reaction at the anode in the stack.

Note also that the stack is permitted to operate at a higher average temperature due to improved internal heat control from counterflow reformate/air pathways. This allows the active area of the electrolyte to have a flatter temperature profile closer to the thermal limits of the stack seals and interconnects, thus improving power density and system efficiency.

Note also that the improved stack cooling and resulting higher stack temperature provides a hotter cathode air effluent which allows heat exchangers 14, 26 to be downsized.

Note also that the high recycle rate of syngas allows the cooler reformate to participate more fully in temperature control of the stack and thus requires substantially less cathode airflow, thus permitting the air pump to be downsized.

While the invention has been described by reference to specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A fuel cell system for generating electricity by combination of oxygen with hydrogen-containing fuel, comprising:
   a) a plurality of individual fuel cells organized into a fuel cell stack assembly including a plurality of cathodes and anodes, said cathodes and said anodes in said stack assembly are provided with air and reformate passages, respectively, adjacent thereto, each of said air passages includes an inlet and an outlet, and each of said reformate passages includes an inlet and an outlet; and
   b) a catalytic reformer for reforming hydrocarbon to provide hydrogen-containing reformate fuel to said stack assembly,
   wherein said stack assembly exhausts syngas,
   wherein at least 60% of said exhausted syngas is recycled into said reformer,
   wherein said air and reformate passages are formed such that air and reformate are flowed through said respective passages in opposite directions such that a substantial amount of cooling is provided on both an anode and a cathode side of the fuel cell, and
   wherein said inlets of said air passages are adjacent to said outlets of said reformate passages, and wherein said inlets of said reformate passages are adjacent to said outlets of said air passages.

2. A fuel cell system in accordance with claim 1 wherein about 90% to 95% of said exhausted syngas is recycled into said reformer.

3. A fuel cell system in accordance with claim 1 wherein reforming in said reformer includes endothermic reforming of hydrocarbons in combination with water and/or carbon dioxide.

4. A fuel cell system in accordance with claim 1 wherein said reformate is provided from said reformer at a temperature between about 600° C. and about 800° C., and wherein said syngas exhaust is provided from said stack assembly at a temperature between about 750° C. and about 1000° C.

5. A fuel cell system in accordance with claim 1 wherein said fuel cells are selected from the group consisting of solid-oxide fuel cells and molten carbonate fuel cells.

6. A fuel cell system in accordance with claim 1 further including a high temperature pump for recycling high fractions of said exhausted syngas to said reformer, such that the temperatures of said exhausted syngas is greater than the temperature of the reformer and heat energy of said exhausted syngas is used to carry waste heat from said fuel cell stack assembly to said reformer.

7. A vehicle comprising a fuel cell system wherein said fuel cell system includes:
   a plurality of individual fuel cells organized into a fuel cell stack assembly including a plurality of cathodes and anodes, said cathodes and said anodes in said stack assembly are provided with air and reformate passages, respectively, adjacent thereto, each of said air passages includes an inlet and an outlet, and each of said reformate passages includes an inlet and an outlet, and
   a catalytic reformer for reforming hydrocarbon to provide hydrogen-containing reformate fuel to said stack assembly,
   wherein said stack assembly exhausts syngas,
   wherein at least 60% of said exhausted syngas is recycled into said reformer,
   wherein said air and reformate passages are formed such that air and reformate are flowed through said respective passages in opposite directions such that a substantial amount of cooling is provided on both an anode and a cathode side of said fuel cell stack, and
   wherein said inlets of said air passages are adjacent to said outlets of said reformate passages, and wherein said inlets of said reformate passages are adjacent to said outlets of said air passages.

8. A method for operating a high temperature fuel cell system for generating electricity by combination of oxygen with a hydrogen-containing fuel, said system including a plurality of individual fuel cells organized into a fuel cell stack assembly including a plurality of cathodes and anodes and a catalytic reformer for reforming hydrocarbon to provide hydrogen-containing reformate fuel to said stack assembly, said cathodes and said anodes in said stack assembly are provided with air and reformate passages, respectively, adjacent thereto, each of said air passages includes an inlet and an outlet, and each of said reformate passages includes an inlet and an outlet, wherein said inlets of said air passages are adjacent to said outlets of said reformate passages, and wherein said inlets of said reformate passages are adjacent to said outlets of said air passages, said method comprising the steps of:
   a) directing air into said air passages in a first direction;
   b) directing said reformate fuel into said reformate passages in said stack assembly in a second direction that is opposite of said first direction such that a substantial amount of cooling is provided on both an anode and a cathode side of said fuel cell stack;
   c) exhausting a massflow of syngas from said stack assembly; and d) recycling a portion of said syngas massflow into said catalytic reformer, wherein said recycled portion is between about 60% and about 95% of said syngas massflow.

9. A method in accordance with claim 8 wherein said recycled syngas portion includes water and carbon dioxide, further comprising the step of endothermically reforming a fuel using said water and carbon dioxide in said reformer to produce hydrogen and carbon monoxide.

10. A fuel cell system for generating electricity by combination of oxygen with hydrogen-containing fuel, comprising:
   a) a plurality of individual fuel cells organized into a fuel cell stack assembly including a plurality of cathodes and anodes, said cathodes and said anodes in said stack assembly are provided with air and reformate passages, respectively, adjacent thereto; and
   b) a catalytic reformer for reforming hydrocarbon to provide hydrogen-containing reformate fuel to said stack assembly,
   wherein said stack assembly exhausts syngas,
   wherein at least 60% of said exhausted syngas is recycled into said reformer, and
   wherein said air and reformate passages are formed such that air and reformate are flowed through said respective passages in opposite directions such that a substantial amount of cooling is provided on both an anode and a cathode side of the fuel cell, and
   wherein a temperature of said reformate introduced into said reformate passages and a temperature of said air introduced into said air passages are about equal.

11. A fuel cell system in accordance with claim 10 wherein said temperature of said reformate introduced into said reformate passages is about 650° C. and said temperature of said air introduced into said air passages is about 680° C.

* * * * *